United States Patent
Murakawa

(10) Patent No.: US 8,112,812 B2
(45) Date of Patent: Feb. 7, 2012

(54) RECORDING MEDIUM AND DEVICE ADMINISTRATION APPARATUS

(75) Inventor: Akira Murakawa, Toyonaka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1630 days.

(21) Appl. No.: 11/419,005

(22) Filed: May 18, 2006

(65) Prior Publication Data

US 2007/0033657 A1 Feb. 8, 2007

(30) Foreign Application Priority Data

Aug. 4, 2005 (JP) ................................. 2005-227180

(51) Int. Cl.
*G06F 17/30* (2006.01)

(52) U.S. Cl. ........... 726/27; 726/1; 726/2; 726/3; 726/4; 726/5; 726/6; 726/7; 713/189; 713/193; 380/243; 380/244; 380/245; 380/246

(58) Field of Classification Search ............... 726/1–7, 726/26, 27; 380/243–246; 713/189, 193
See application file for complete search history.

(56) References Cited

U.S. PATENT DOCUMENTS

| | | | | |
|---|---|---|---|---|
| 6,490,049 B1 * | 12/2002 | Cunnagin et al. | ............ | 358/1.13 |
| 7,577,838 B1 * | 8/2009 | Rossmann | ............ | 713/165 |
| 7,913,300 B1 * | 3/2011 | Flank et al. | ............ | 726/12 |
| 2004/0054893 A1 * | 3/2004 | Ellis | ............ | 713/165 |
| 2004/0148516 A1 * | 7/2004 | Tohgi et al. | ............ | 713/200 |
| 2005/0011881 A1 | 1/2005 | Kijimoto et al. | | |
| 2005/0060564 A1 * | 3/2005 | Murakami et al. | ............ | 713/200 |
| 2005/0172151 A1 * | 8/2005 | Kodimer et al. | ............ | 713/201 |
| 2006/0026105 A1 | 2/2006 | Endoh | | |
| 2007/0011207 A1 * | 1/2007 | Vishnubhotla | ............ | 707/200 |

FOREIGN PATENT DOCUMENTS

| | | | |
|---|---|---|---|
| JP | 2003-051905 | | 2/2003 |
| JP | 2003051905 | * | 2/2003 |
| JP | 2003-078701 | | 3/2003 |
| JP | 2004-139149 | | 5/2004 |
| JP | 2004139149 | * | 5/2004 |
| JP | 2004-302616 | | 10/2004 |
| JP | 2004302616 | * | 10/2004 |
| JP | 2005-034379 | | 2/2005 |
| JP | 2005-115522 | | 4/2005 |
| JP | 2005-157446 | | 6/2005 |

OTHER PUBLICATIONS

Notification of Reasons for Refusal in JP 2005-227180 dated Jan. 6, 2009, and an English Translation thereof.

* cited by examiner

*Primary Examiner* — Vivek Srivastava
*Assistant Examiner* — Hee Song
(74) *Attorney, Agent, or Firm* — Buchanan Ingersoll & Rooney PC

(57) ABSTRACT

In a recording medium, a device administration program for making a computer execute the following steps using a usage restriction definition file is recorded. The usage restriction definition file is capable of defining at least one administration function among a plurality of administration functions of a device and includes a device password for obtaining an authentication of the device. The steps comprises a step of reading a usage availability definition information of the administration functions and the device password from the usage restriction definition file, a step of transmitting the read device password to the device, a step of recognizing usage availabilities of a plurality of administration functions of the device based on the read definition information, and a step of executing processing for using only usage available administration function based on the recognized results.

14 Claims, 9 Drawing Sheets

RECORDING MEDIUM AND DEVICE ADMINISTRATION APPARATUS

This application claims priority under 35 U.S.C. §119 to Japanese Patent Application No. 2005-227180 filed on Aug. 4, 2005, the entire disclosure of which is incorporated herein by reference in its entirety.

BACKGROUND OF THE INVENTION

1. Field of the Invention

The present invention relates to a recording medium in which a device administration program for administering a device such as, e.g., an image forming apparatus is recorded, and also relates to a device administration apparatus.

2. Description of the Related Art

The following description sets forth the inventor's knowledge of related art and problems therein and should not be construed as an admission of knowledge in the prior art.

In accordance with the functional sophistication of such devices, various settings are required to fulfill the functions appropriately. In a case of an image forming apparatus such as, e.g., a MFP (Multi Function Peripherals) which is a digital complex machine, various settings are required. Such settings include a network setting, editing of authentication data, address settings for an email address to which image data is to be sent. In addition to the above, also required are ex-post administrations such as adding and/or changing of the aforementioned set data.

Such administration of the device including initialization settings of the device and changing and/or adding of the initial settings is performed exclusively by the device administrator to secure the security. In performing the operation, it is usually required to input a device password proving the administrator.

Recently, such administration can be performed via a personal computer as an administration device using a specific device administering program (hereinafter may be simply referred to as "application").

In cases where the aforementioned device administration is performed via a personal computer, by using a single application (denoted as "App" in figure) 110 containing a plurality of administration functions as shown in FIG. 10, it was conventionally possible to use a plurality of administration functions of the device 200. In other words, it was possible to set and/or change all of the settings such as the network setting, the editing of authentication data, and the address settings.

Meanwhile, an administrator may wish to entrust one or more specified administration functions to his/her sub-administrator. In such case, according to the application 110 of the type shown in FIG. 10, however, once the device password is given to the sub-administrator, there is such a drawback that it becomes possible for the sub-administrator to use not only the one or more specified administration functions but also all of the administration functions, causing a security problem.

In order to solve such drawback, as shown in FIG. 11, it can be considered to employ a method in which applications 101 to 104 are created on each administration function and an administrator gives only specified applications to his/her sub-administrator to entrust the corresponding administration functions. In this method, administration functions capable of being used by the sub-administrator can be limited even if the device password is given to the sub-administrator.

On the other hand, as shown in FIG. 12, US 2004/0148516 A1 proposes a method in which execution modules 121 and 122 capable of utilizing specific functions are given to the application 120 as plug-ins. In this method, once a plug-in is installed, a function corresponding to the plug-in becomes executable.

However, in the method shown in FIG. 11 in which applications are created every administration function and only applications for specified administration functions are given to an sub-administrator, the administrator has to administer the applications 101 to 1041 corresponding to administration functions of many kinds and select specific applications among them for an sub-administrator, which causes very troublesome administration.

In a method shown in FIG. 12 in which execution modules 121 and 122 capable of utilizing specific functions are given as plug-ins, the administrator also has to administer many execution modules 121 and 122 every specific function and select specific plug-ins among them to distribute for an sub-administrator, which also causes very troublesome administration. In addition, it is required to regulate the connecting method for connecting the basic portion 120 of the application and the plug-in modules 121 and 122, resulting in troublesome processing.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a recording medium in which a device administration program is recorded, wherein the device administration program is capable of removing a burden of administering an application to be distributed to a sub-administrator as well as preventing all of the administration functions from becoming available to the sub-administrator in cases where an administrator wishes to entrust an administration of specific administration functions of the device to the sub-administrator.

Among other potential advantages, some embodiments can provide a recording medium in which a device administration program is recorded, wherein the program does not require troublesome processing of regulating a connecting method of a basic portion of an application and a plug-in module.

Among other potential advantages, some embodiments can provide a device administration apparatus operated with the aforementioned device administration program.

According to a first aspect of the preferred embodiment of the present invention, a recording medium in which a device administration program for making a computer execute the following steps using a usage restriction definition file is recorded, wherein the usage restriction definition file is capable of defining usage availability or unavailability of at least one administration function among a plurality of administration functions of a device and includes a device password for obtaining an authentication of the device, and wherein the steps comprises:

a step of reading usage availability definition information of the at least one administration function and the device password from the usage restriction definition file;

a step of transmitting the read device password to the device;

a step of recognizing usage availabilities of the plurality of administration functions of the device based on the read definition information; and a step of executing processing for using only usage available administration function based on the recognized result.

According to a second aspect of the preferred embodiment of the present invention, a device administration apparatus, comprising:

a recording portion for recording a usage restriction definition file which is capable of defining a usage availability or usage disavailability of at least one administration function among a plurality of administration functions of a device and includes a device password for obtaining an authentication to the device;

a reading portion for reading the usage availability definition information of the administration functions and the device password from the usage restriction definition file;

a transmitting portion for transmitting the read device password to the device;

a recognizing portion for recognizing usage availabilities of the plurality of administration functions of the device based on the read definition information; and an executing portion for executing processing for using only usage available administration function based on the recognized result.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
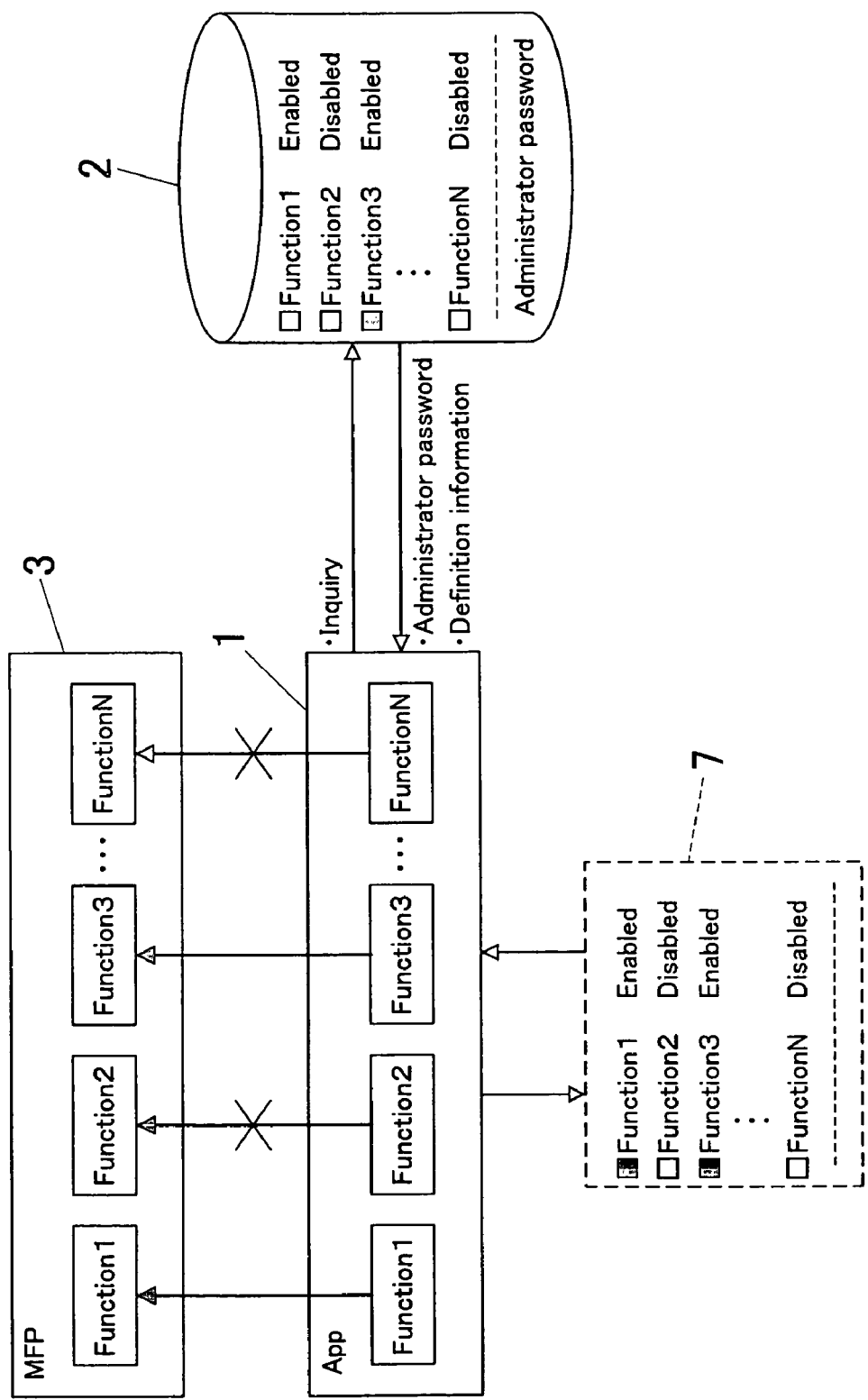
FIG. 1 is a schematic explanatory view showing a basic structure of a device administration program according to an embodiment of this invention.

FIG. 1 is a schematic view showing the basic structure of a device administration program 1 (hereinafter this program may be referred to as "application" as previously mentioned) according to an embodiment of the present invention. In this embodiment, the device to be administered is a MFP 3 as one of image forming apparatuses.

This program 1 basically makes a computer execute the processing of using a plurality of administration functions of the MFP 3 such as, e.g., a network setting function, an authentication data editing function, or an address setting function. However, whether or not the processing is to be executed is determined by the contents of the usage restriction definition file 2.

The usage restriction definition file 2 can preliminary enable an administrator to define at least one enabled or disabled administration function among the plurality of administration functions of the MFP3.

The method for defining the enabled(available)/disabled (unavailable) administration function is not specifically limited, and can be exemplified as follows.

(1) Defining Only Enabled Administration Functions

In this case, as to the administration functions not defined as being enabled, the sub-administrator cannot use the administration functions. Accordingly, even if a new administration function is added in accordance with the version upgrade of the application 1, the administration functions defined as being enabled can be continuously used without changing the usage restriction definition file 2.

(2) Defining Only Disabled Administration Functions

In this case, as to the administration functions not defined as being disabled, the sub-administrator can use the functions. For example, under the condition that important administration functions are preliminarily defined as being disabled, in cases where unimportant administration functions are added in accordance with the version upgrade of the application 1, the added administration functions can be used without changing the usage restriction definition file 2.

(3) Defining Both the Enabled Administration Functions and the Disabled Administration Functions In this case, as to a newly added administration function in accordance with the version upgrade of the application 1, whether the function is enabled or disabled should be preliminarily decided in the application 1 or the usage restriction definition file 2.

In the example shown in FIG. 1, a total of "N" administration functions are written in the usage restriction definition file 2. The administration function 1 and the administration function 3 denoted as black squares are defined as being enabled, and the administration function 2 and the administration function N denoted as white squares are defined as being disabled.

The usage restriction definition file 2 contains not only the definition information of the administration functions but also the administrator password which is a device password which makes the MFP 3 authenticate the administrator.

In this embodiment, the definition information on whether the administration function is enabled or disabled and the administration password contained in the usage restriction definition file 2 are preliminary encrypted so that the sub-administrator cannot see them. Instead of the above, either one of them can be encrypted.

Accordingly, in order to read the encrypted definition information on whether the administration function is enabled or disabled and the administration password from the usage restriction definition file 2, it is required to decrypt them using an encryption key. In one example of a decryption method, an encryption key preliminary embedded in the application 1 is used. Alternatively, it is possible to employ a method in which a reading password for the usage restriction definition file 2 is given to the sub-administrator so that the sub-administrator can input this password at the time of reading the usage restriction definition file 2.

However, it is troublesome to execute the decryption processing every time the usage restriction definition file 2 is read.

Therefore, in this embodiment, when the MFP administration application 1 is installed in the terminal device of the sub-administrator (hereinafter referred to as "sub-administrator terminal device") which is a personal computer for example, the sub-administrator terminal device executes an inquiry to the usage restriction definition file 2 based on the application 1 to read the definition information of the administration function and the administrator password and decrypt them using an encryption key.

The decrypted definition information and administrator password are saved as a file of a unique format that the program can easily administrate. The reference numeral "7" in FIG. 1 denotes a file for storing the contents of the usage restriction definition file 2 separately from the usage restriction definition file 2.

When the sub-administrator terminal device executes the installed MFP administration application 1 against the MFP 3 to be administered, the terminal device reads the definition information and the administrator password stored in the storing file 7 to execute the processing.

As mentioned above, since the contents of the usage restriction definition file 2 are stored separately from the usage restriction definition file 2, it becomes unnecessary to read the contents of the usage restriction definition file 2 from the file 2 every time it is connected to the MFP 3 to decrypt the encrypted contents, resulting in simplified processing.

In the meantime, the definition information and the administrator password are very important data, and therefore it causes security problems to save them in the storing file 7 different from the usage restriction definition file 2 in the decrypted manner.

Accordingly, it is preferable that the application 1 has its own encryption key, so that the key is used to encrypt the contents of the usage restriction definition file 2 at the time of storing the contents in the storing file 7 of a unique form, decrypt the stored contents with the encryption key of the application 1 to read them at the time of reading the contents, to thereby restrict the execution of the processing of the administration function and use the administrator password in accordance with the read information.

The aforementioned structure has various advantages. For example, an administration method peculiar to the application becomes available, resulting in increased freedom degree. An encryption every administration function unit or only an encryption of only the administrator password becomes available. A decryption of only the necessary information becomes available, which enables efficient processing as compared with the case in which all of the information is to be decrypted.

Figure 2:
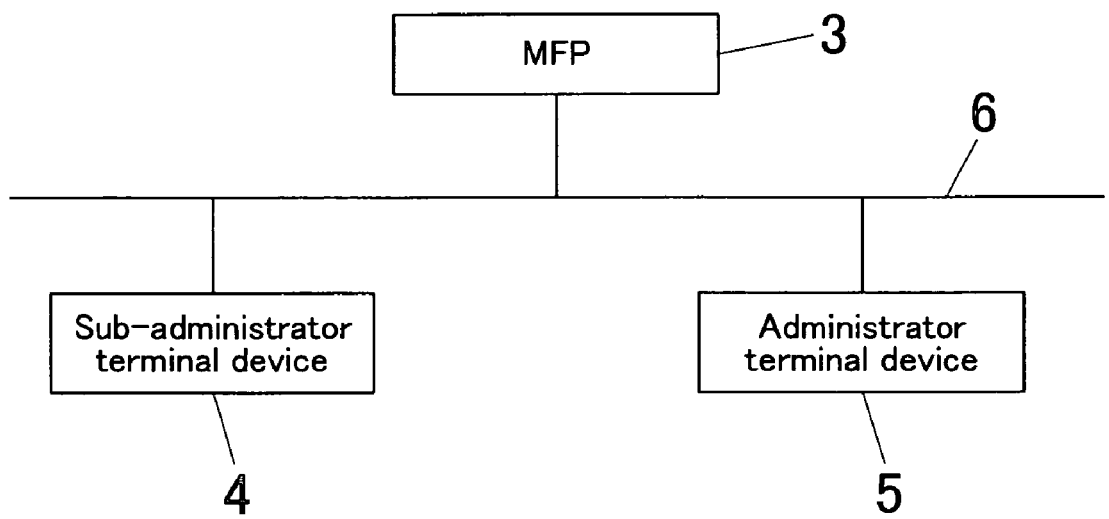
FIG. 2 is a structural view of a network administration system for administering the MFP 3.

FIG. 2 is a structural view of a network administration system for administering the MFP 3. In this system, the MFP 3, the sub-administrator terminal device 4 and the terminal device 5 of the administrator (hereinafter referred to as "administrator terminal device") are connected via the network 6.

Figure 3:
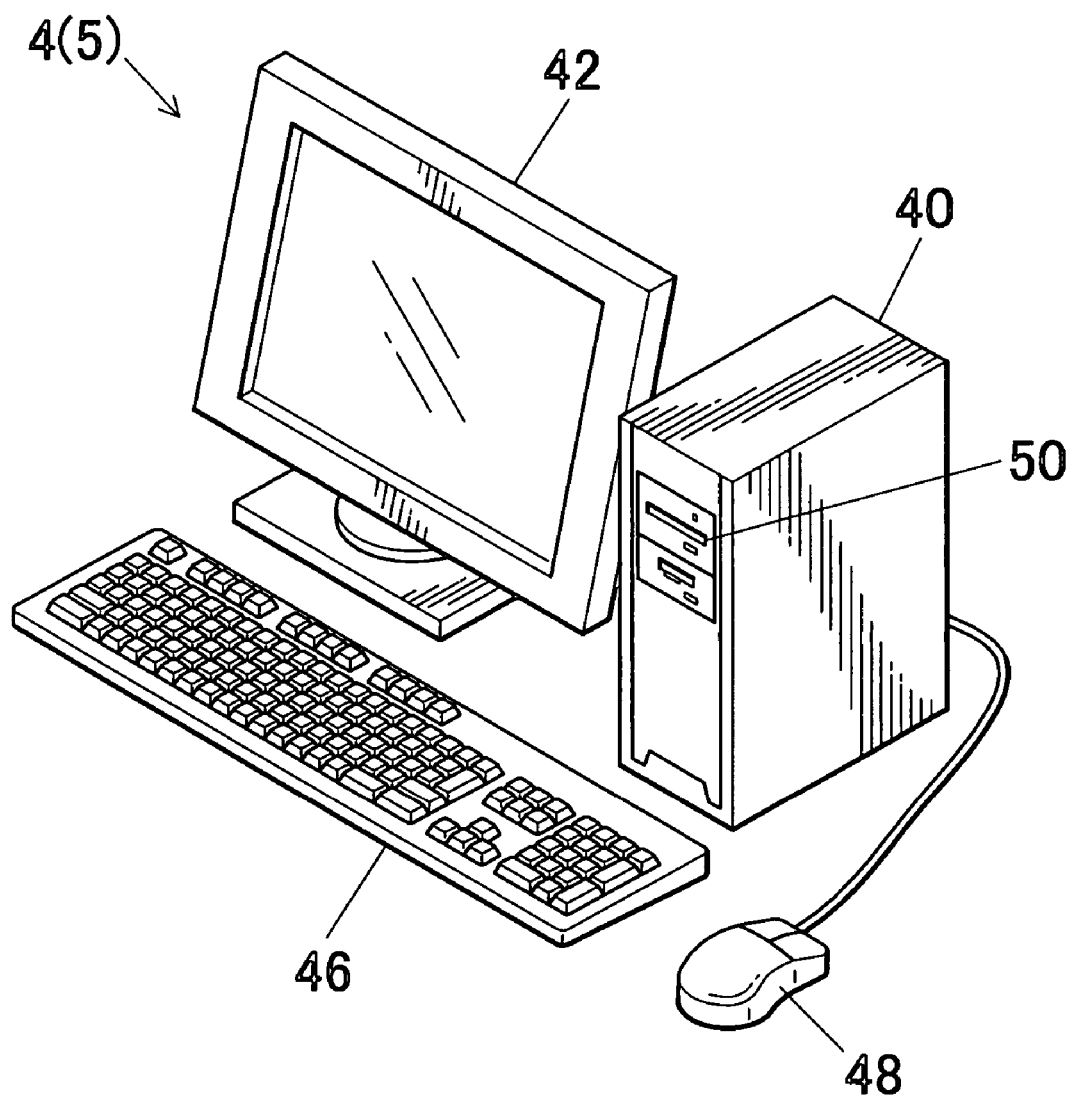
FIG. 3 is a perspective view showing a personal computer used as a terminal device for a sub-administrator or an administrator.
Figure 4:
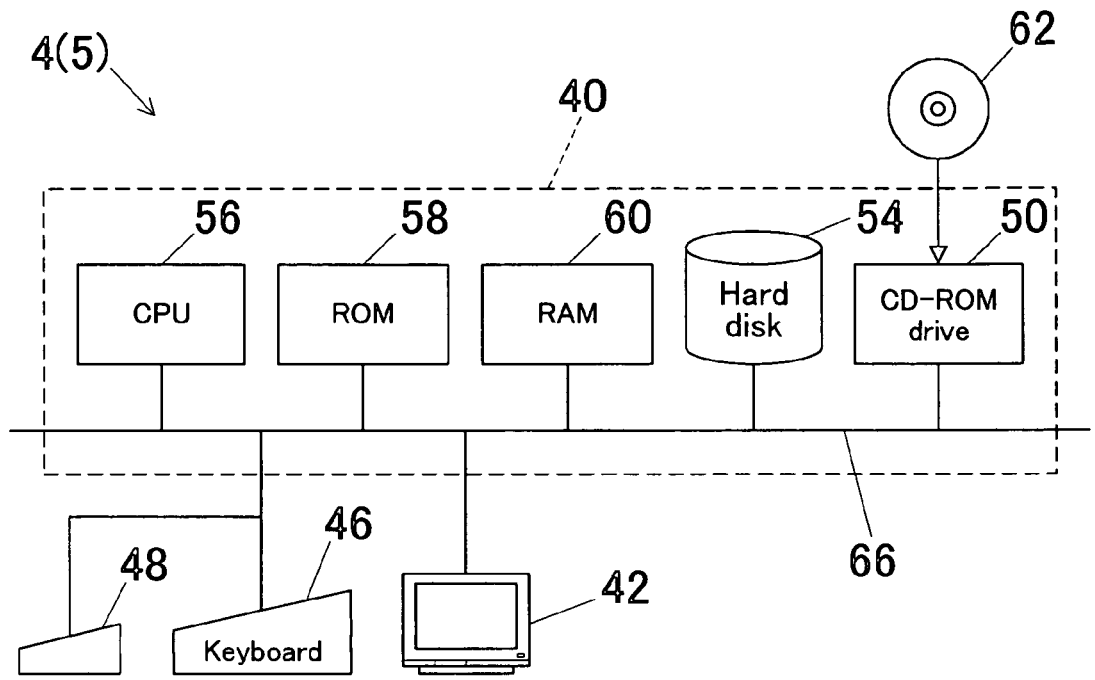
FIG. 4 is a block diagram of the personal computer used as a terminal device for a sub-administrator or an administrator.

FIG. 3 shows the external view of the personal computer constituting the sub-administrator terminal device 4 or the administrator terminal device 5. FIG. 4 shows a block diagram thereof. It should be understood that the sub-administrator terminal device 4 or administrator terminal device 5 is merely one example and can take any structure other than the structure shown in these figures.

The sub-administrator terminal device 4 and the administrator terminal device 5 include a personal computer main body 40, a monitor or display 42 connected to the main body 40, a keyboard 46, and a mouse 48, respectively. The personal computer main body 40 includes a built-in CD-ROM drive 50, etc.

As shown in FIG. 4, the personal computer main body 40 further includes a bus 66 to which the CD-ROM drive 50 is connected, a CPU 56 connected to the bus 66, a ROM 58 connected to the bus 66 and storing a program to be executed by the CPU 56, a RAM 60 connected to the bus 66 and providing a working area to be used by the CPU 56, and a hard disk 54.

The aforementioned MFP administration application 1 recorded in a recording medium such as, e.g., the CD-ROM 62 will be provided to a sub-administrator together with the usage restriction definition file 2 created by an administrator, and then stored in the hard disk 54 via a reading device such as, e.g., the CD-ROM drive 50 to be installed. Alternatively, the MFP administration application 1 can be transmitted from the administrator terminal device 5 to the sub-administrator terminal device 4 via the network 6 and stored in the hard disk 54 to be installed.

When the CPU 56 executes this application 1, the CPU 56 reads out this program from the hard disk 54, stores it in the RAM 60, and then executes it while reading the commands.

The operation of a personal computer itself is well-known, and therefore the detail explanation will be omitted here.

Figure 5:
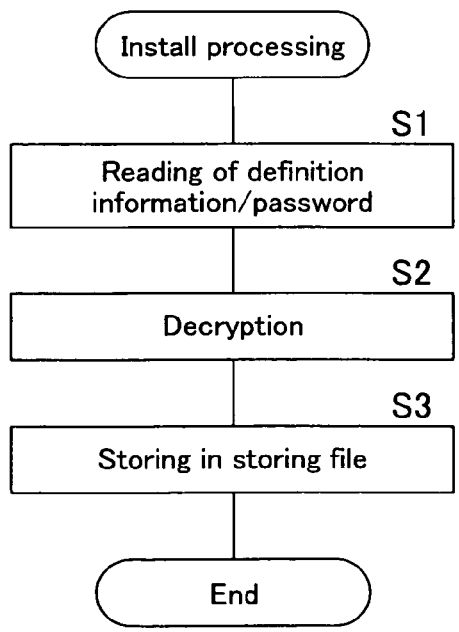
FIG. 5 is a flowchart showing the processing to be executed when a CPU of the sub-administrator installs a MFP administration application.

FIG. 5 is a flowchart showing the processing to be executed when the CPU 54 of the sub-administrator terminal device 4 installs the MFP administration application 1.

At Step S1, the CPU 56 reads the encrypted definition information on the usage availabilities of administration functions and the encrypted administrator password from the usage restriction definition file 2 stored in the hard disk 54, and decrypts them at Step S2. Thereafter, as Step S3, the decrypted information and password are stored in the hard disk 54 in a state in which they are stored in the storing file 7 different from the usage restriction definition file 2. The storing can be performed in an encrypted state if needed.

Thereafter, when the sub-administration terminal device 4 uses the administration function of the MFP 3 based on the application 1, the CPU 56 reads the definition information and the administrator password from the storing file 7.

Figure 6:
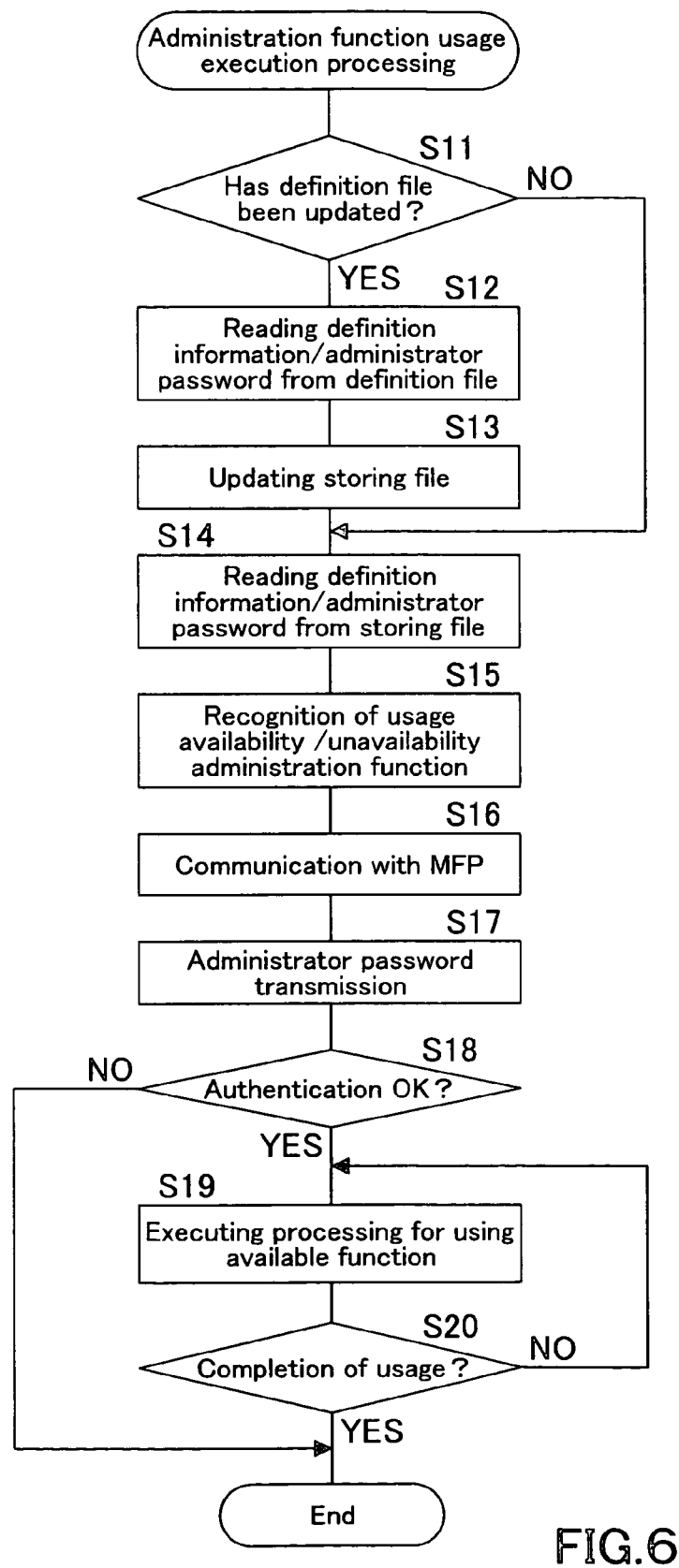
FIG. 6 is a flowchart showing the processing to be executed when the sub-administrator terminal device uses the administration function of the MFP based on the MFP administration application.

FIG. 6 is a flowchart showing the processing to be executed when the sub-administrator terminal device 4 uses the administration function of the MFP 3 based on the application 1.

When the application is activated, at Step S11, it is discriminated whether the usage restriction definition file 2 is updated. If not updated (NO at Step S11), the routine proceeds to Step S14. To the contrary, if updated (YES at Step S1), the routine proceeds to Step S12 to read the definition information and the administrator password from the usage restriction definition file 2 at Step S12. Thereafter, the stored contents of the storing file 7 are updated at Step S13, and then the routine proceeds to Step S14.

The discrimination on whether the usage restriction definition file 2 has been updated can be performed as follow for example. That is, when the usage restriction definition file 2 was read last, the file updated time information including the year, the month, the date, the hour, the minute, and the second and the location of the file are stored. Then, the updated time information of the usage restriction definition file 2 located at the specified location is obtained to compare with the stored previous updated time information. If both information coincides, it is discriminated that the information has not been updated. If both information does not coincide, it is discriminated that the information has been updated.

The processing of Step S11 to Step S13 can be executed every prescribed time period in place of the activation time of the application 1.

At Step S14, the CPU 56 reads the definition information and the administrator password from the storing file 7.

Thereafter, at Step S15, based on the read definition information, the available (enabled) administration function and the unavailable (disabled) administration function are recognized.

Then, at Step S16, the CPU 56 communicates with the MFP 3 to exchange necessary data, and transmits the read administrator password to the MFP 3 at Step S17.

If the transmitted administrator password is real (correct), the MFP 3 returns an authentication success signal to the sub-administrator terminal device 4. To the contrary, if false (wrong), the MFP 3 returns an authentication failure signal.

At Step S18, the CPU 56 discriminates whether the return signal from the MFP 3 is an authentication success signal. If the authentication is failed (NO at Step S18), the processing terminates as it is. To the contrary, if the authentication is succeeded (YES at Step S18), the routine proceeds to Step S19.

At Step S19, based on the recognition results recognized at Step S15, processing for using only available administration functions is executed. Concretely, it becomes ready to accept operation inputs from the sub-administrator to use the administration functions (e.g., an operation screen is displayed on the display 42). When there is any operation input, the corresponding command is sent to the MFP 3 and receives the corresponding reply from the MFP 3.

Thereafter, at Step S20, it is discriminated whether the use of the administration function has been completed. If not completed (NO at Step S20), the routine returns to Step S19. If completed (YES at Step S20), this processing terminates.

Thus, the sub-administrator can use only the administration functions allowed by the administrator.

Figure 7:
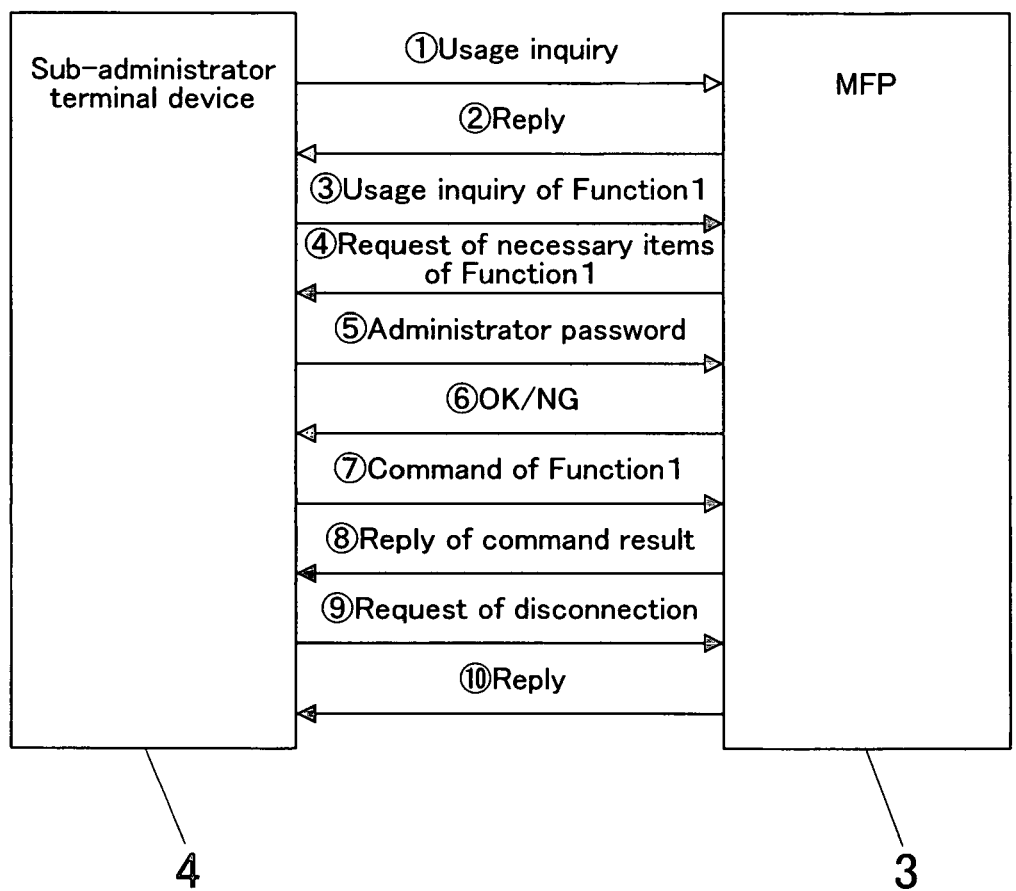
FIG. 7 is an explanatory view showing the data exchange between the sub-administrator terminal device and the MFP at the time of using the administration function of the MFP.

FIG. 7 is an explanatory view showing the data exchange between the sub-administrator terminal device 4 and the MFP 3 at the time of using the administration function of the MFP 3, and shows the contents of the Step S16 to Step S20 in FIG. 6.

When the CPU 56 of the sub-administrator terminal device 4 sends a usage inquiry (①), the MFP 3 sends a reply (②). Then, the CPU 56 inquires of the MFP 3 whether the usage of the administration function is enabled (③), the MFP 3 sends a reply (④). At that time, restrictions on the administration usage and/or necessary information may sometimes be provided.

Next, the CPU 56 transmits the administrator password (⑤). The MFP 3 sends back an authentication success signal if the administration password is real (correct), but sends back an authentication failure signal if the administration password is false (wrong) (⑥).

In the case of the authentication success, the CPU 56 transmits a command corresponding to the operation of the sub-administrator (⑦), and the MFP 3 returns the executed result of the command (⑧). In the case of executing processing by a plurality of commands, transmitting and returning commands are executed.

When the use of the administration function terminates, the CPU 56 requires a disconnection (⑨), and the MFP 3 responds to it.

Figure 8:
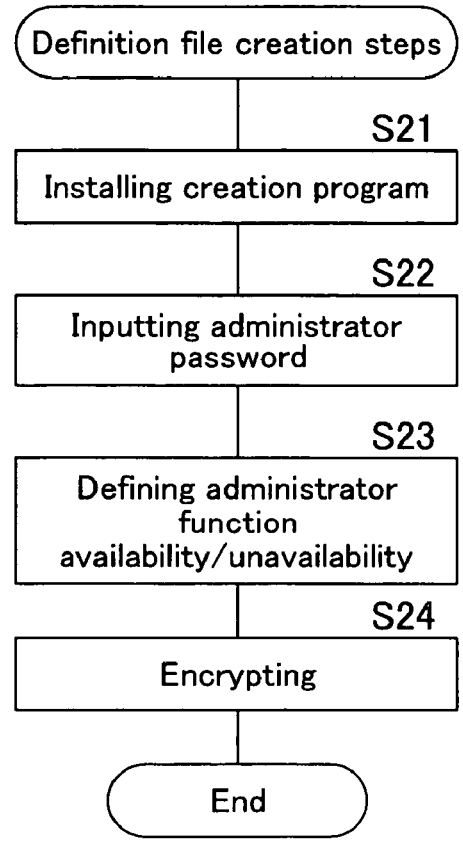
FIG. 8 is a flowchart showing the steps to be taken when an administrator creates a usage restriction definition file using the administrator terminal device.

FIG. 8 is a flowchart showing steps of creating a usage restriction definition file 2 by an administrator using his/her administrator terminal device 5.

Initially, the administrator installs the application for creating the usage restriction definition file 2 at Step S21, and then inputs the administrator password at Step S22. If necessary, the administrator terminal device 5 can send an inquiry to the MFP 3 to confirm the accuracy of the inputted password.

Then, at Step S23, as to predetermined administration functions, the usage availabilities thereof are defined so that only the administration functions to be assigned to the sub-administrator become available. Specifically, for example, the definition can be performed by checking the administration function checking boxes to be enabled.

Next, at Step S24, the definition information and the administrator password are encrypted.

The usage restriction definition file 2 created as mentioned above will be provided to the sub-administrator as a part of the MFP administrator application 1.

As will be understood from the above explanation, in this embodiment, the usage restriction definition file 2 is capable of defining the usage availability of at least one administration function among a plurality of administration functions of the MFP (device) 3. Therefore, the administrator can provide the program to the sub-administrator in a state in which some administration functions to be assigned to the sub-administrator are defined to be enabled (available) and the other administration functions not to be assigned to the sub-administrator are defined to be disabled (unavailable).

In accordance with the program, the CPU (computer) 56 reads the usage availability definition information of the administration function and the device password from the usage restriction definition file 2, transmits the device password to the MFP 3, and then recognizes the usage availabilities of the plurality of administration functions of the MFP 3.

Based on the recognition results, processing for using only the available administration functions is executed.

Accordingly, the administrator is no longer required to administrate applications and/or execution modules every sub-administration function, select certain applications among the applications to provide them to the sub-administrator. The administrator is merely required to administrate only one usage restriction definition file 2 and change the usage availability definitions of the administration functions depending on the sub-administrator, resulting in easy administration.

The CPU 56 executes the processing for using only the administration functions recognized as available (enabled) administration functions, and does not execute the processing for using the administration functions recognized as unavailable (disabled) administration functions. Therefore, there is no inconvenience that the sub-administrator can use all of the administration function of the device.

Furthermore, the usage restriction definition file 2 includes a device password to obtain an authentication of the administrator from the MFP 3, and the CPU 56 transmits this device password to the MFP 3. Therefore, it is not required for the sub-administrator to manually input the device password every connection to the MFP 3 to be administrated, which makes it convenient.

Furthermore, it is also not necessary to execute the troublesome processing for regulating the connecting method between the application basic portion and the plug-in module which is required to make certain administration functions available with the plug-in module.

Figure 9:
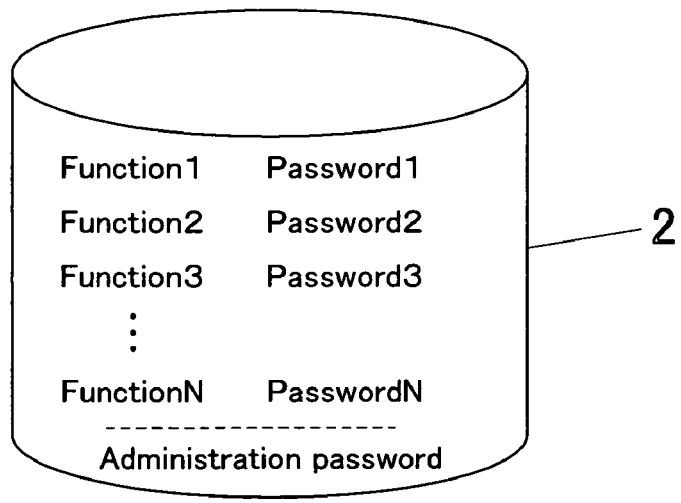
FIG. 9 is a schematic view showing the structure of the usage restriction definition file according to another embodiment of this invention.
Figure 10:
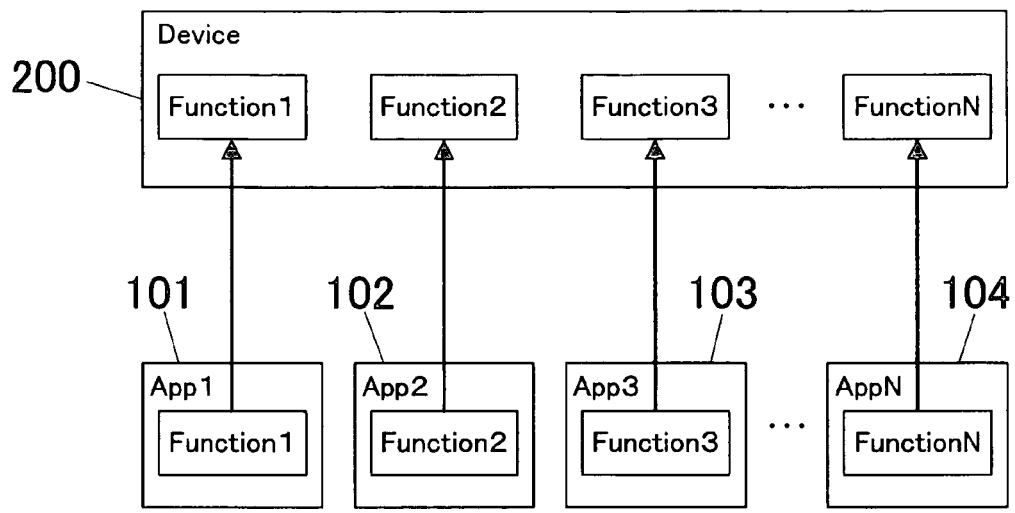
FIG. 10 is a schematic view showing an example of a structure of a conventional device administration application.
Figure 11:
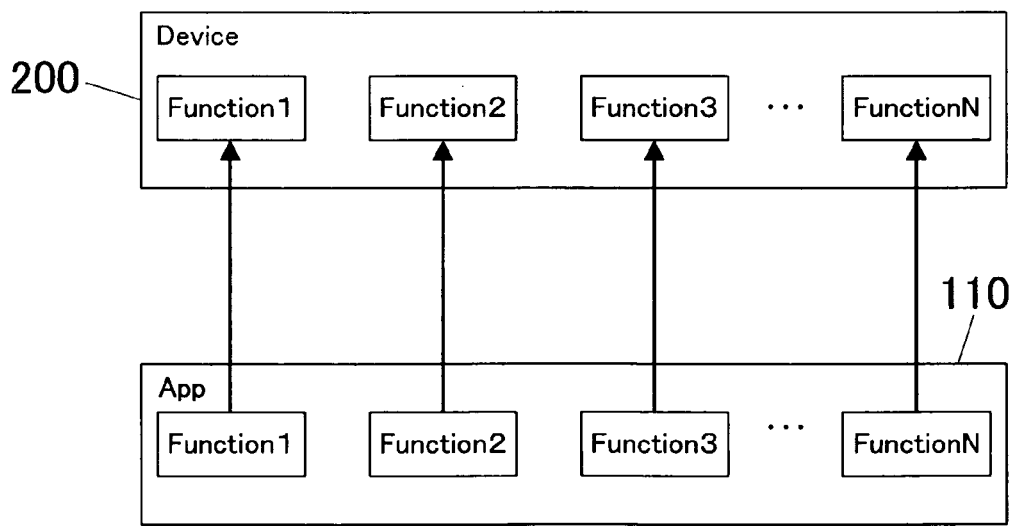
FIG. 11 is a schematic view showing an example of another structure of a conventional device administration application.
Figure 12:
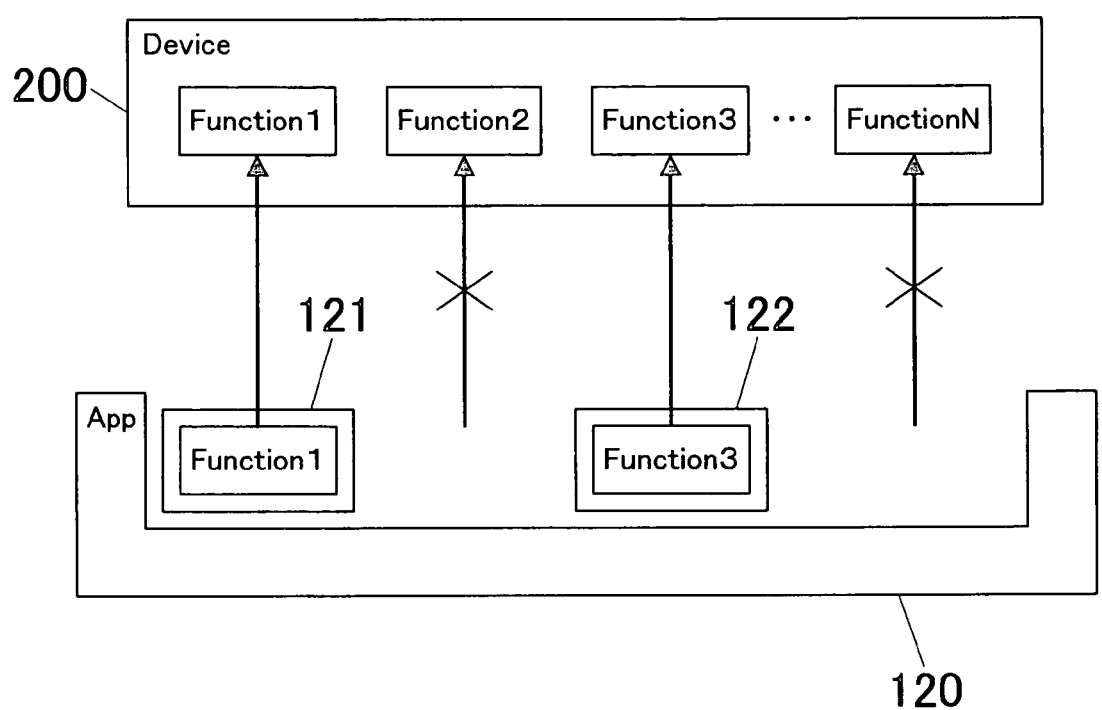
FIG. 12 is a schematic view showing an example of still another structure of a conventional device administration application.

FIG. 9 shows another embodiment. In this embodiment, a file password is given by an administrator to each of the administration functions contained in the usage restriction definition file 2. The administrator notifies the sub-administrator of the file passwords of predetermined administration functions among the administration functions contained in the usage restriction definition file 2 to make the sub-administrator to use only the administration functions that the administrator desires.

When the sub-administrator inputs the file password notified by the administrator, it is discriminated by the CPU 56 of the sub-administrator terminal device 4 whether the inputted file password coincides with the set file password. Only when both the passwords coincide, the CPU 56 reads the usage availability definition information corresponding to the administration function and the administrator password. Thus, only the predetermined administration functions become available.

As mentioned above, a file password is set to each of the administration functions contained in the usage restriction definition file 2 and the usage availability definition information of the administration functions can be read when the file password and the inputted password coincide. Therefore, when the administrator creates only one usage restriction definition file in which a file password is given to each of the administration functions and changes the password of the administration function to be notified to the sub-administrator every sub-administrator, it is possible to obtain the same effects as in the case in which available administration functions are set to each sub-administrator. As a result, it becomes possible to cut out the need of creating a separate usage restriction definition file every sub-administrator.

Although a preferable embodiment has been explained above, the present invention is not limited to the embodiment. For example, although the embodiment is directed to the case in which the invention is applied to the administration application 1 of the MFP 3, the invention can also be applied to the image forming apparatus other than MFPs or various devices other than image forming apparatuses.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example;" and "NB" which means "note well."

What is claimed is:

1. A non-transitory recording medium in which a device administration program for making a computer execute the following steps using a usage restriction definition file is recorded, wherein the usage restriction definition file is capable of defining usage availability or unavailability of at least one administration function among a plurality of administration functions of a device and includes a device password for obtaining an authentication of the device, and wherein the steps comprise: a step of reading usage availability definition information of the at least one administration function and the device password from the usage restriction definition file;

a step of transmitting the read device password to the device;

a step of recognizing usage availabilities of the plurality of administration functions of the device based on the read definition information; and a step of executing processing for using only usage available administration function based on the recognized result;

wherein the device is an image forming apparatus and the computer is a terminal device that is separate from the image forming apparatus; and the reading step includes storing the device password in a memory separate from the usage restriction definition file; and wherein the transmitting step includes transmitting the read device password from the memory to the device.

2. The non-transitory recording medium in which the device administration program is recorded as recited in claim 1,
wherein the device administration program makes the computer further execute a step of storing the usage availability definition information of the administration functions read from the usage restriction definition file in a file different from the usage restriction definition file, and
wherein after storing the usage availability definition information of the administration functions, the usage availabilities of the plurality of administration functions of the device are recognized based on the stored definition information at the recognizing step.

3. The non-transitory recording medium in which the device administration program is recorded as recited in claim 1, wherein the usage availability definition information of the administration functions and/or the device password contained in the usage restriction definition file are encrypted.

4. The non-transitory recording medium in which the device administration program is recorded as recited in claim 1, wherein a file password is set to each of the administration functions contained in the usage restriction definition file, and wherein the computer can read the usage availability definition information of the administration functions when the file password coincides with the inputted password.

5. The non-transitory recording medium in which the device administration program is recorded as recited in claim 1, wherein in cases where an available administration function is defined in the usage restriction definition file, the computer is capable of using the administration function defined to be available, and recognizes the other administration function to be unavailable.

6. The non-transitory recording medium in which the device administration program is recorded as recited in claim 1, wherein in cases where an unavailable administration function is defined in the usage restriction definition file, the computer is incapable of using the administration function defined to be unavailable, and recognizes the other administration function to be available.

7. The non-transitory recording medium in which the device administration program is recorded as recited in claim 1, wherein the device administration program makes the computer further execute the following steps, the steps comprises:
a step of discriminating whether the usage restriction definition file is updated; and
a step of reading the usage availability definition information of the administration functions and/or the device password from the updated usage restriction definition file when the usage restriction definition file is updated.

8. A device administration apparatus, comprising:
a recording portion for recording a usage restriction definition file which is capable of defining a usage availability or usage unavailability of at least one administration function among a plurality of administration functions of a device and includes a device password for obtaining an authentication to the device;
a reading portion for reading the usage availability definition information of the administration functions and the device password from the usage restriction definition file;
a transmitting portion for transmitting the read device password to the device;
a recognizing portion for recognizing usage availabilities of the plurality of administration functions of the device based on the read definition information; and
an executing portion for executing processing for using only usage available administration function based on the recognized result;
wherein the device is an image forming apparatus and the device administration apparatus is a terminal device that is separate from the image forming apparatus; and the reading portion stores the device password in a memory separate from the usage restriction definition file; and
wherein the transmitting portion transmits the read device password from the memory to the device.

9. The device administration apparatus as recited in claim 8, wherein the recording portion records the usage availability definition information of the administration functions read from the usage restriction definition file in a state in which the definition information is stored in a file different from the usage restriction definition file, and
wherein after storing the definition information in the different file, the recognizing portion recognizes the usage availability of a plurality of administration functions of the device based on the definition information stored in the different file.

10. The device administration apparatus as recited in claim 8, wherein the usage availability definition information of the administration functions and/or the device password contained in the usage restriction definition file are encrypted.

11. The device administration apparatus as recited in claim 8, wherein a file password is set to each of the administration functions contained in the usage restriction definition file, and wherein the reading portion can read the usage availability definition information of the administration functions when the file password coincides with the inputted password.

12. The device administration apparatus as recited in claim 8, wherein in cases where an available administration function is defined in the usage restriction definition file, the recognizing portion is capable of using the administration function defined to be available, and recognizes the other administration function to be unavailable.

13. The device administration apparatus as recited in claim 8, wherein in cases where an unavailable administration function is defined in the usage restriction definition file, the computer is incapable of using the administration function defined to be unavailable, and recognizes the other administration function to be available.

14. The device administration apparatus as recited in claim 8, further comprising a detecting portion for detecting whether the usage restriction definition file is updated, wherein the reading portion reads the usage availability definition information of the administration functions and/or the device password from the updated usage restriction definition file when the usage restriction definition file is updated.

* * * * *